Figure 1:
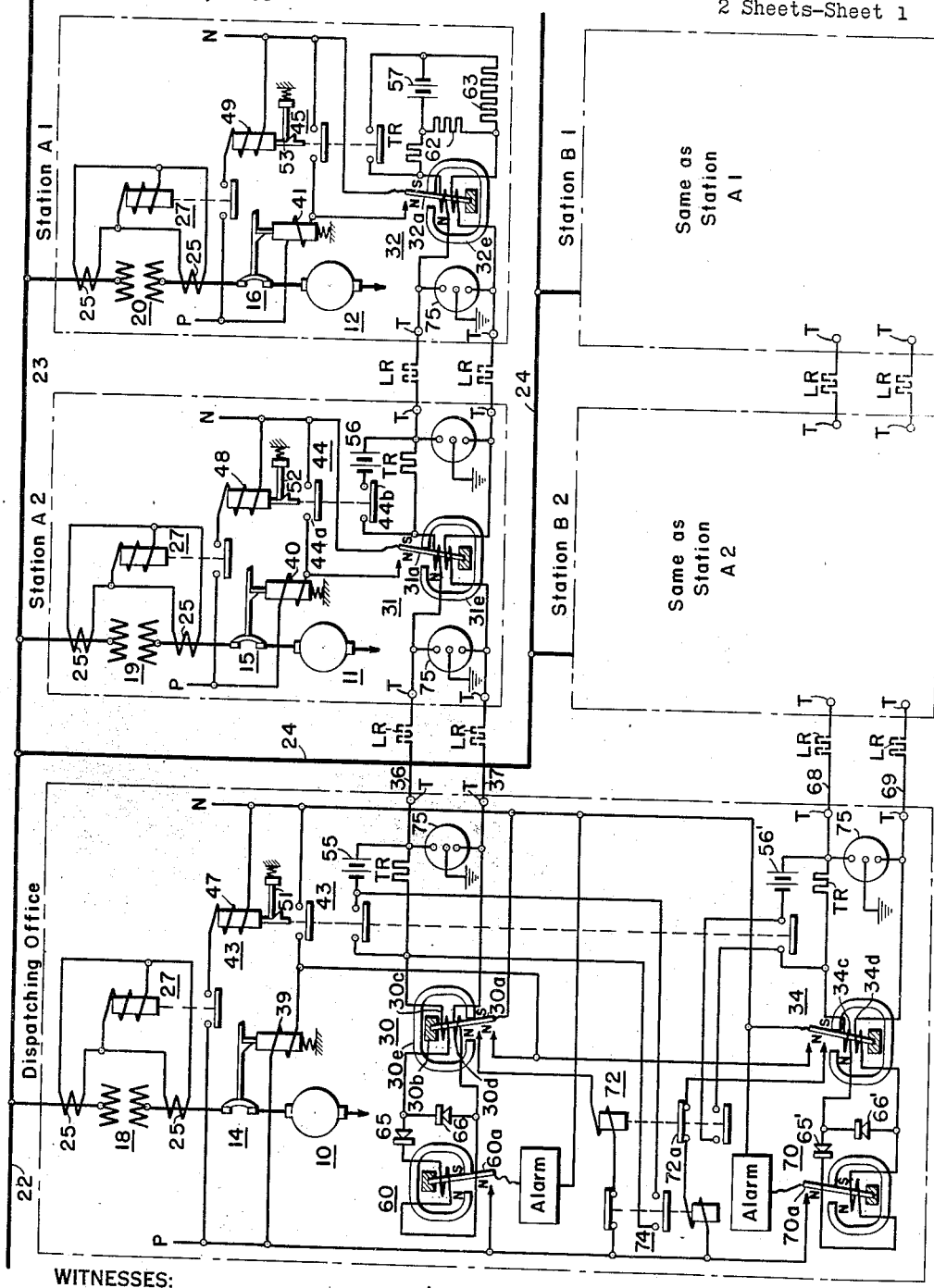

INVENTORS
Willard A. Derr &
Carl L. Cadwell
BY
Ralph H. Swingle
ATTORNEY

United States Patent Office 2,840,802
Patented June 24, 1958

2,840,802

CONTROL SYSTEMS

Willard A. Derr and Carl L. Cadwell, Pittsburgh, Pa., assignors to Westinghouse Electric Corporation, East Pittsburgh, Pa., a corporation of Pennsylvania Application June 4, 1953, Serial No. 359,534

11 Claims. (Cl. 340—213)

Our invention relates generally to control systems and apparatus, and it has reference in particular to a remote control system for a plurality of circuit breakers at different locations.

Generally stated, it is an object of our invention to provide a novel control circuit for a plurality of circuit breakers, which is simple and inexpensive to install and is reliable and effective in operation.

More specifically, it is an object of our invention to provide a remote control circuit for a plurality of circuit breakers using a closed loop control circuit with control relays at each of a plurality of circuit breaker stations which are responsive to a predetermined polarity applied to the loop in response to operation of a fault responsive relay at any one station.

Another object of our invention is to provide in a remote control system for a plurality of circuit breakers at different stations for using a voltage of one polarity for effecting supervision of a control circuit and a voltage of the opposite polarity for operating relays to trip each of the circuit breakers in response to a fault at any one of the stations.

Yet, another object of our invention is to provide in a circuit breaker control system for using only a single pair of conductors for tripping a plurality of circuit breakers from each of a plurality of locations, and for maintaining supervision of the control system.

It is also an object of our invention to provide for supervising not only the line conductors of a circuit breaker control circuit but also the coils of the control relays connected in the circuit for effecting operation of a plurality of circuit breakers.

Other objects will, in part, be obvious and will, in part, be explained hereinafter.

In practicing our invention in accordance with one of its embodiments, generating apparatus at each of several different stations is connected by a generator circuit breaker and a transformer to a power distribution circuit. Protection against transformer faults at any of the stations is effected by using a common control circuit for tripping all of the circuit breakers in response to a fault at one of the transformers. Protective relays, which are polarity sensitive, are connected to the control circuit at each station. Normally, a voltage having a polarity opposite to that required to operate the protective relays is supplied to the control circuit from the most remote station to maintain a line supervision relay at a dispatching office at the other end of the control circuit. The protective relays at each station are arranged to effect connection of a voltage of the reverse polarity to the control circuit in the event of a fault at their particular station, so as to effect operation of all the protective circuit breaker relays.

Figure 2:
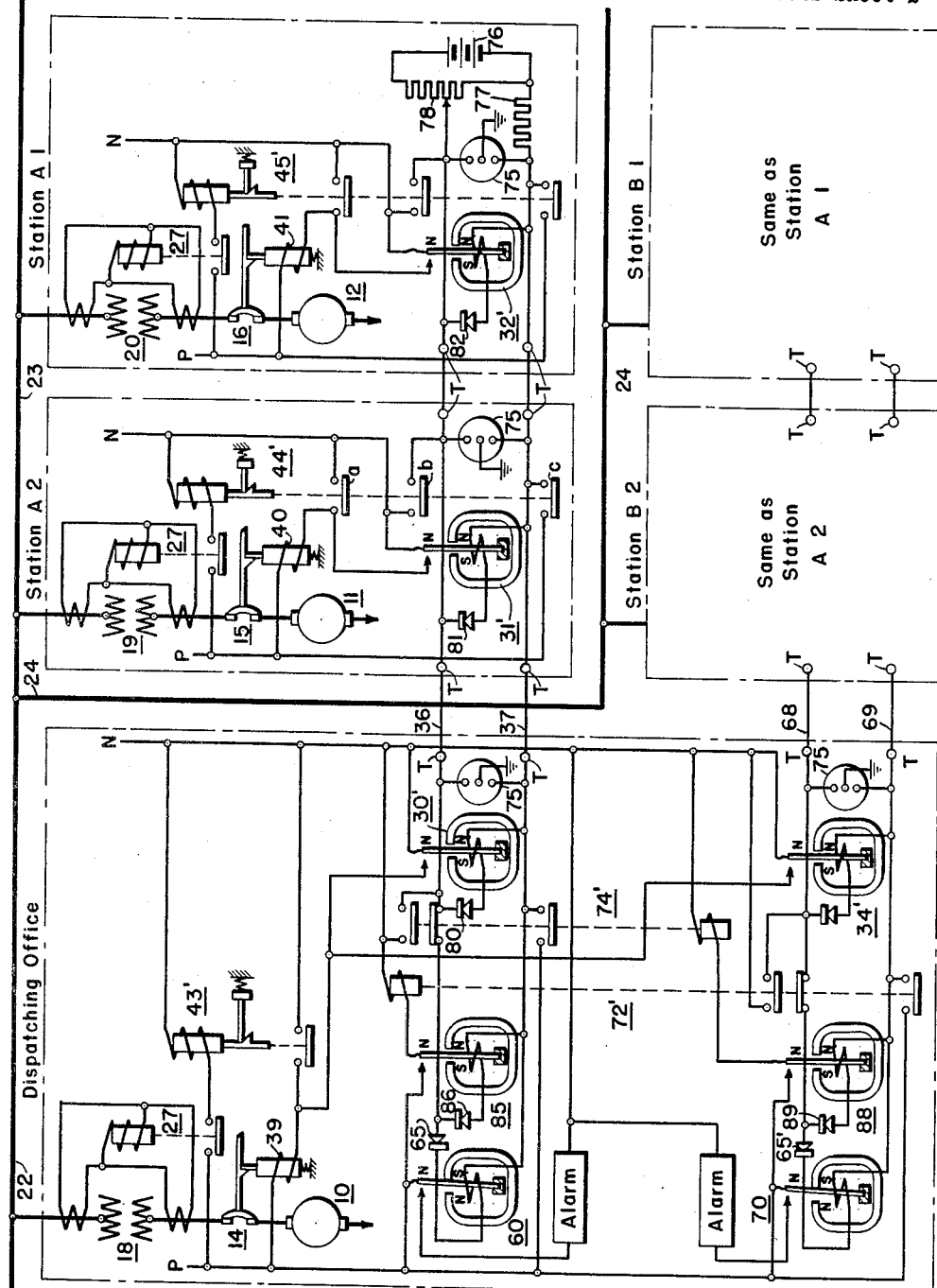

For a more complete understanding of the nature and scope of our invention, reference may be made to the following detailed description, which may be read in connection with the accompanying drawings, in which:

Figure 1 is a diagrammatic view of a power system embodying the invention in one of its forms; and Fig. 2 is a diagrammatic view of a power system embodying the invention in a different form.

Referring particularly to Fig. 1 of the drawings, the reference numerals 10, 11 and 12 may designate generators which are disposed to be connected by means of circuit breakers 14, 15 and 16 and transformers 18, 19 and 20 to the main conductor 22 and the branch conductor 23 of a power system, respectively. The generator 10 may be at one location designated as the dispatching office, while the generators 11 and 12 may be at different locations spaced along the branch conductor 23 and designated as stations A2 and A1, respectively. Additional generators, transformers and other similar equipment, as shown at the stations A2 and A1, may be located at stations B2 and B1 connected to an additional branch conductor 24. Since the apparatus at these two stations is substantially identical with that at the stations A2 and A1, it will not be illustrated in detail.

Each of the transformers 18, 19 and 20 may be provided with differential protection afforded by means of current transformers 25 connected on the primary and secondary sides of the transformers for operating a differential protective relay 27. Since the impedance of the transformers may be sufficiently high to prevent direct operation of the circuit breaker at any one station, when a fault occurs at another station, means, such as the circuit breaker relays 30, 31 and 32, may be provided at each of the dispatching office and stations A2 and A1, respectively. Similar relays are also provided at the stations B1 and B2 along with an additional such relay 34 at the dispatching office.

Each of these relays may be of a polarity sensitive type comprising, for example, in the case of the relay 30, a resilient contact member 30a mounted in a fixed support 30b and being of a magnetic material, such as iron or the like. Operating windings 30c and 30d surround the contact member 30a so as to provide for magnetizing it with a polarity dependent on the direction of the current through the windings, in order to effect attraction and repulsion thereof with the poles of a permanent magnet 30e between the poles of which the contact member 30a is mounted.

The operating windings 30c and 30d are connected between line terminals T at each of the dispatching office and the stations, in series with each of two line conductors 36 and 37 which provide a control circuit for the circuit breakers 14, 15 and 16. The relay 30, for example, is arranged to provide an energizing circuit for the trip winding 39 of the circuit breaker 14, while the relays 31 and 32 are arranged to provide energizing circuits for connecting the trip windings 40 and 41 of the circuit breakers 15 and 16 to a source of control voltage at their respective stations in response to a voltage of positive polarity applied to the conductor 36. In order to apply such polarity to the conductor 36, trip control relays 43, 44, and 45 are provided in conjunction with the circuit breakers 14, 15 and 16, respectively, having operating windings 47, 48 and 49 disposed to be energized in response to operation of their respective fault relays 27. Latch devices 51, 52 and 53, respectively, maintain the relays 43, 44 and 45 in the operative position until released, either manually or otherwise. Each of these relays is disposed to connect the conductor 36 to its associated station battery 55, 56 or 57, so as to apply the voltage thereof across a 1,000 ohm resistor TR connected in circuit with the conductor at the particular station.

To maintain supervision of the control circuit, a line supervision relay 60 is provided at the dispatching office, being of the polarized type similar to the relay 30. A 5,000 ohm resistor 62 and an 11,000 ohm resistor 63 are connected across the battery 57 at the most remote station A1, so as to apply to the conductor 36 a voltage of the polarity which is the reverse of that used to operate the relays 30, 31 and 32, but is of a polarity such that it holds the resilient contact member 60a of the line supervision relay 60 away from its stationary contact. Relay 60 is connected between conductors 36 and 37 in series with a rectifier device 65 which blocks the operating voltage for the relays 30, 31 and 32 from the line supervision relay, while a shunt connected rectifier 66 provides a by-pass circuit around the line supervision relay for such potential. Resistors LR represent the line resistance of the control circuit which in the present instance runs about 1000 ohms total.

The operating windings 34c and 34d of the polarized relay 34 are each connected in series with line conductors 68 and 69 of a control circuit extending from the dispatching office to the stations B2 and B1, and a line supervision relay 70 is likewise connected in series with the conductors 68 and 69 in conjunction with rectifier devices 65' and 66' for operation in response to a line supervision potential which is the reverse of that required to operate the relay 34. In order to provide for opening the circuit breakers at stations B2 and B1 when a fault occurs at a station on conductor 22 or 23 and vice versa, interlocking relays 72 and 74 may be provided for applying a reverse potential to the conductors 68 and 69 and to the conductors 36 and 37 in response to operation of the circuit breaker relays 30 and 34, respectively. Protective gap devices 75 are connected between the conductors 36, 37 and 68, 69 and ground at each station to protect the apparatus against line surge and the like.

With the system normally energized, a line supervision potential is applied to the conductors 36, 37 and 68, 69, so as to hold the contact members 60a and 70a away from their stationary contacts as shown, this potential being applied to the conductors 36 and 37, for example, by reason of the drop across resistor 62 at station A1. Should the conductors of either control circuit be short-circuited or open-circuited by reason of damage, either to the conductors themselves or by reason of an open circuit in one of the operating windings of the circuit breaker relays, a loss of potential results at the line supervision relay 60 or 70 of the particular circuit which is faulted. This immediately causes energization of the line supervision alarm, indicating the faulty condition.

Should a fault occur on the transformer 19, for example, at station A2, the differential relay 27 thereof operates, providing an obvious energizing circuit for the operating winding 48 of the trip control relay 44. An obvious energizing circuit is provided through contact member 44a for the trip winding 40 of circuit breaker 15 to effect opening of the circuit breaker. At the same time, the station battery 56 is connected by contact member 44b across the 1,000 ohm resistor TR so as to apply a voltage to the control circuit in a direction such as to magnetize the contact members 30a, 31a and 32a, such that they are attracted by the permanent magnets 30e, 31e and 32e to the left, thus providing obvious energizing circuits for the trip coils 39 and 41 to effect opening of circuit breakers 14 and 16. This voltage, being of a polarity which is the reverse of the line supervision potential applied to the control circuit at station A1, obviously blocks such voltage and the supervision relay 60 at the dispatching office is therefore deenergized to energize the alarm.

Operation of relay 30 in addition to tripping its circuit breaker 14 provides an obvious energizing circuit for the interlocking relay 72. This relay operates, interrupting any possible energizing circuit for the interlocking relay 74 at contact member 72a, and connecting the station battery 56' across the 1,000 ohm resistor TR in conductor 68 to provide a voltage of the polarity necessary to operate the polarized relays at stations B2 and B1 for opening their circuit breakers.

Referring to Fig. 2 of the drawings, it will be seen that the generators 10, 11 and 12 are connected to conductors 22 and 23 through circuit breakers 14, 15 and 16 in conjunction with transformers 18, 19 and 20 in substantially the same manner as shown in Fig. 1. Each of the transformers is also provided with a differential protective relay 27 for operating a trip control relay 43', 44' and 45' which energizes the trip winding 39, 40 and 41 of its respective circuit breaker, and also provides for connecting a reverse polarity to the conductors 36, 37 and 68, 69. The conductors 36 and 37 are normally provided with a line supervision potential from a voltage divider 78 connected across the station battery 76 at the remote station A1. This voltage is applied to the conductors through a resistor 77 which may be of a relatively high resistance on the order of, for example, 10,000 ohms. This potential is applied to a line supervision relay 60 at the dispatching office so as to provide for energization of a line supervision alarm in the event of a loss of potential at the dispatching office. While the relay 60 is shown as being of the polarized construction described in connection with Fig. 1 of the drawings, it will be realized that a polarized relay of this construction is not actually necessary since polarization is effected by means of the rectifier device 65. Each of the circuit breaker control relays 30', 31' and 32', which are shown as being of the same polarized construction, need not necessarily be of this construction since they are individually polarized by rectifier devices 80, 81 and 82, respectively, being connected in shunt circuit relation with the conductors 36 and 37, so as to be responsive only to a voltage of a polarity which is the reverse of that normally applied to the conductors from the battery 76 for line supervision purposes. Operation of these relays may be effected by connecting the conductors 36 and 37 to the station batteries at the different stations through contacts of the trip control relays 44' and 45' in response to operation of these relays as a result of a fault at the particular station.

In order to provide for operation of the circuit breakers at the stations B1 and B2 in response to a reverse potential applied to conductors 36 and 37 and vice versa, interlocking relays 72' and 74' may be provided. Relay 72' may be provided with an operating winding energized under the control of a polarity responsive relay 85 including a rectifier device 86 connected in shunt circuit relation with the conductors 36 and 37. Interlocking relay 74' may be controlled by a polarity responsive relay 88 and rectifier device 89 connected in shunt with control circuit conductors 68 and 69.

With the circuit in the energized position as shown, a line supervision potential is applied to the conductors 36, 37 and 68, 69 from the stations A1 and B1 for operating the line supervision relays 60 and 70 to the positions shown. Any loss of this potential at the dispatching office whether by open circuit, or short circuit of the control circuit, or the application of a reverse tripping voltage results in deenergization of the respective line supervision relay, thus causing operation of the associated line supervision alarm.

Should a fault occur on transformer 19, for example, differential relay 27 operates, providing an obvious energizing circuit for effecting operation of the trip control relay 44'. This provides an obvious energizing circuit for the trip winding 40 through contact member a of relay 44', opening circuit breaker 15. Contact members b and c of relay 44' connect the conductors 36 and 37 to the negative and positive of the control source at station A2, respectively. This causes energization and operation of the polarized relays 30', 31' and 32' which results in tripping circuit breakers 14 and 16. At the same time, interlocking relay 72' is operated as a result of the operation of polarized relay 85, and a reverse polarity is also applied to conductors 68 and 69 to effect the operation of the circuit breakers at stations B2 and B1 in response to operation of their associated polarized relays.

From the above description and the accompanying drawings, it will be apparent that we have provided in a simple and effective manner for controlling a plurality of circuit breakers at remote locations in response to a fault condition at any one of the locations. A control circuit embodying the features of our invention is simple and inexpensive to install and is reliable and effective in operation. Continuous supervision of the control circuit is obtained without causing operation of the circuit breakers in response to fault conditions on the control circuit only.

Since certain changes may be made in the above-described construction, and different embodiments of the invention may be made without departing from the spirit and scope thereof, it is intended that all the matter contained in the above description and shown in the accompanying drawings shall be considered as illustrative and not in a limiting sense.

We claim as our invention:

1. In a control circuit for a plurality of circuit breakers, a relay connected to the circuit for each breaker operable in response to a voltage of a predetermined polarity to trip the breaker, means associated with each breaker operated by a fault condition electrically affected by operation of the breaker to connect the circuit to a direct current source to applying a voltage of said polarity to the circuit to operate the relays, a line supervision relay connected to the circuit responsive to the opposite polarity, and means normally connecting the circuit to a source to apply a lower voltage of said opposite polarity to all of the relays.

2. In a control system for a plurality of circuit breakers connecting generating apparatus to different branch circuits, a control circuit for each branch circuit, a line supervision relay connected in each control circuit responsive to a voltage of one polarity, means connecting each control circuit to a source to apply a voltage of said polarity to each control circuit at a remote point, a relay associated with each circuit breaker connected to the control circuit associated with its branch circuit for tripping said breaker in response to a voltage of the opposite polarity, means operable to connect one of the circuits to a source of said opposite polarity, and relay means connected to each circuit operable in response to the application of a voltage of said opposite polarity to one control circuit to connect said other control circuit to a source to apply a voltage of said opposite polarity to the other control circuit.

3. Distribution apparatus comprising, a plurality of circuit breakers connecting a power circuit to sources at different locations, a transformer interposed between each circuit breaker and the power circuit, a control relay for each breaker operable in response to a voltage of a predetermined polarity to trip its breaker, a fault responsive relay individual to each transformer operated by a fault in its transformer to trip its associated circuit breaker, and a control circuit including contacts of each of said fault responsive relays connecting the control relays to different sources for applying voltage of said predetermined polarity to the control relays for tripping the other circuit breakers.

4. In combination, a plurality of circuit breakers connecting generating apparatus to a power circuit at spaced apart locations, a transformer connected between each circuit breaker and the power circuit, a differential fault protective device for each transformer operated by a fault in said transformer, a polarity responsive relay individual to each circuit breaker, circuit means connecting the polarity responsive relays in a control circuit, means connecting said control circuit to a direct current source for applying to said control circuit in response to operation of any one of the protective devices a voltage of a value and polarity such as to operate all the polarity responsive relays associated therewith, a supervision relay responsive to the opposite polarity connected to said control circuit at one location, and means connecting the circuit to a source at a location remote from said one location for applying to said circuit from a remote location a supervision potential lower than the aforesaid voltage and having the opposite polarity to normally operate the supervision relay.

5. In a remote control system for a plurality of circuit breakers connecting a power circuit to different sources at spaced apart locations and having a control circuit extending among the several locations, a line supervision relay connected to the control circuit adjacent one end, a rectifier connected in series with a control circuit and the line supervision relay to render said relay responsive to a voltage of one predetermined polarity, means operable to connect the control circuit to a source to apply a voltage of said polarity to the control circuit adjacent the other end for normally operating the line supervision relay, a control relay operable to trip each circuit breaker connected to the control circuit at each location, a rectifier connected in series with each control relay to render it responsive only to a voltage of an opposite polarity, and means inluding a fault responsive relay connecting the control circuit to a source to apply to the control circuit at each location a voltage of said opposite polarity to operate the control relays and render the supervision relay inoperative.

6. A remote control system for a plurality of circuit breakers connecting a power circuit to a plurality of sources comprising, a polarity sensitive relay individual to each circuit breaker operable to trip said breaker, a fault responsive relay operated by a fault condition individual to each circuit breaker, a control circuit connecting the polarity sensitive relays including a control relay individual to each breaker operable in response to operation of its associated fault responsive relay to trip its circuit breaker and connect the circuit to a source to apply a voltage of a predetermined polarity to the polarity sensitive relays for operating them, a line supervision relay connected to the control circuit adjacent one end operated only by a voltage of opposite polarity, and means including a direct current source and a relatively high impedance connected to the control circuit adjacent the other end for applying a voltage of said opposite polarity thereto.

7. In a remote control system, a plurality of circuit breakers connecting a power circuit to a plurality of sources, a control circuit comprising a pair of control conductors, a polarity responsive relay individual to each circuit breaker, said relay being operable in response to a voltage of a predetermined polarity to trip its circuit breaker, and having a pair of operating windings, circuit means connecting the windings one in series with each conductor of the control circuit, a line supervision relay responsive to a voltage of the opposite polarity connected in series with the conductors at one end of the control circuit, means including an impedance connected in series with one of the conductors and a direct current source for applying a voltage of said opposite polarity to the control circuit adjacent the other end to normally operate the supervision relay, fault responsive means associated with each circuit breaker, and a control relay operated by operation of its fault responsive relay to trip its circuit breaker and connect a direct current source to the control circuit to apply a voltage of said predetermined polarity to the control circuit for operating the polarity responsive relays and rendering the supervision relay inoperative.

8. A control system for a plurality of circuit breakers connecting branch circuits to a plurality of sources comprising, a polarity sensitive relay for each circuit breaker operable in response to a voltage of one polarity to trip its circuit breaker, circuit means connecting said relays of each branch circuit to a separate control circuit, a line supervision relay for each control circuit operable in response to a voltage of the opposite polarity, means including a relatively high impedance connecting each control circuit to a direct current source for applying a voltage of said opposite polarity to each control circuit, circuit means including a control relay individual to each circuit breaker for tripping the breaker in response to a fault individual to its immediate circuit and connecting its control circuit to a direct current source to apply a voltage to its own control circuit of said predetermined polarity, and means individual to each control circuit operated by said voltage to connect a direct current source to another of the control circuits to apply a voltage of said predetermined polarity to said another control circuit in response to the application thereof to said own control circuit.

9. Protective apparatus comprising, a pair of line supervision relays adapted to be connected to separate control circuits, a rectifier device connected in series with each of said relays to render it responsive to a voltage of one polarity only, a polarized relay individual to each control circuit connected in each circuit in series with the line supervision relay for producing a breaker tripping impulse in response to a voltage of a reverse polarity, means including a master relay operable to connect the control circuits to a direct current source to apply a voltage of said reverse polarity to each of the control circuits, and an interlocking relay individual to each polarized relay operated by its polarized relay to apply a voltage of said reverse polarity to the other circuit.

10. In protective apparatus, two pairs of terminals for connection to separate signal circuits, a polarity responsive control relay individual to each pair of terminals having a pair of windings connected between the terminals of each pair, said relays being operable in response to voltages of a predetermined polarity applied to the terminals to effect a trip operation, a polarity responsive supervision and alarm relay connected between the terminals of each pair intermediate said windings and operable in response to a voltage of the opposite polarity, a master relay operable to connect said terminals to a direct current source to apply a voltage of said predetermined polarity to each pair of terminals, a fault relay operable in response to a fault condition to effect operation of the master relay, and an interlocking relay operated by the control relay of one pair of terminals operable to connect a source of direct current to apply a voltage of said predetermined polarity to the other pair of terminals.

11. In protective apparatus, two pairs of line terminals, a separate control relay connected between the terminals of each pair of line terminals operable to effect a tripping operation, rectifier means connected in series with each of said relays to render it responsive to a voltage of one polarity, a line supervision alarm relay connected in shunt relation with each control relay, rectifier means in series with each supervision relay to make it responsive to a voltage of the opposite polarity, means including an interlocking relay connected in shunt with each control and supervision relay operable to connect a direct current source to apply a voltage of said one polarity to the other pair of terminals, and rectifier means connected in circuit with each of said interlocking relays to render them responsive to a voltage of said one polarity.

References Cited in the file of this patent
UNITED STATES PATENTS

| | | |
|---|---|---|
| 2,065,339 | McLachlan | Dec. 22, 1936 |
| 2,210,669 | Johnson | Aug. 6, 1940 |
| 2,246,816 | Sandstrom | June 24, 1941 |
| 2,374,054 | Travers et al. | Apr. 17, 1945 |
| 2,643,370 | Lawrence | June 23, 1953 |